United States Patent [19]
Rinehart et al.

[11] Patent Number: 5,324,588
[45] Date of Patent: Jun. 28, 1994

[54] POLY(VINYL CHLORIDE) COMPOSITIONS EXHIBITING INCREASED ADHESIVITY TO POLYAMIDE AND MULTI-LAYER STRUCTURES COMPRISING THE SAME

[75] Inventors: Robert E. Rinehart, Fredon; Andrew M. Zweig, West Orange; Peter J. Kartheiser, Long Valley, all of N.J.

[73] Assignee: Allied-Signal Inc., Morris Township, Morris County, N.J.

[21] Appl. No.: 580,232

[22] Filed: Sep. 10, 1990

[51] Int. Cl.$^5$ .............................. B32B 27/34
[52] U.S. Cl. ........................ 428/475.8; 428/458; 428/474.4; 428/475.5; 428/476.9; 428/518
[58] Field of Search .............. 428/423.5, 474.9, 475.8, 428/476.9, 518, 458, 476.1, 475.5; 156/244.11; 524/104, 127, 297; 526/271; 252/511; 525/301

[56] References Cited

U.S. PATENT DOCUMENTS

| | | | |
|---|---|---|---|
| 3,067,085 | 12/1962 | Limperos | 156/327 |
| 4,348,496 | 9/1982 | Puhe | 428/475.8 |
| 4,849,467 | 7/1989 | Shorr | 524/104 |
| 4,868,054 | 9/1989 | Kartheiser | 428/475.8 |

FOREIGN PATENT DOCUMENTS 1257810 12/1971 United Kingdom .

*Primary Examiner*—Paul J. Thibodeau
*Assistant Examiner*—Hoa T. Le
*Attorney, Agent, or Firm*—Andrew N. Parfomak; Roger H. Criss

[57] ABSTRACT

Improved poly(vinyl chloride) compositions which exhibit improved adhesivity to polyamide which find particular utility in the construction of multi-layer structures, particularly for the fabrication of improved structures for use in forming electrical insulation structures for wires and cables. In one useful embodiment, the multi-layer structure has in the following order: a layer of PVC and a layer of polyamide in contact with the layer of PVC wherein the layer of PVC includes a vinyl chloride containing copolymer or a terpolymer which exhibits good solubility with the PVC, and which further provides good adhesivity with the PA. The vinyl resin is selected from the group consisting of vinyl chloride-vinyl acetate-vinyl alcohol terpolymers.

10 Claims, 1 Drawing Sheet

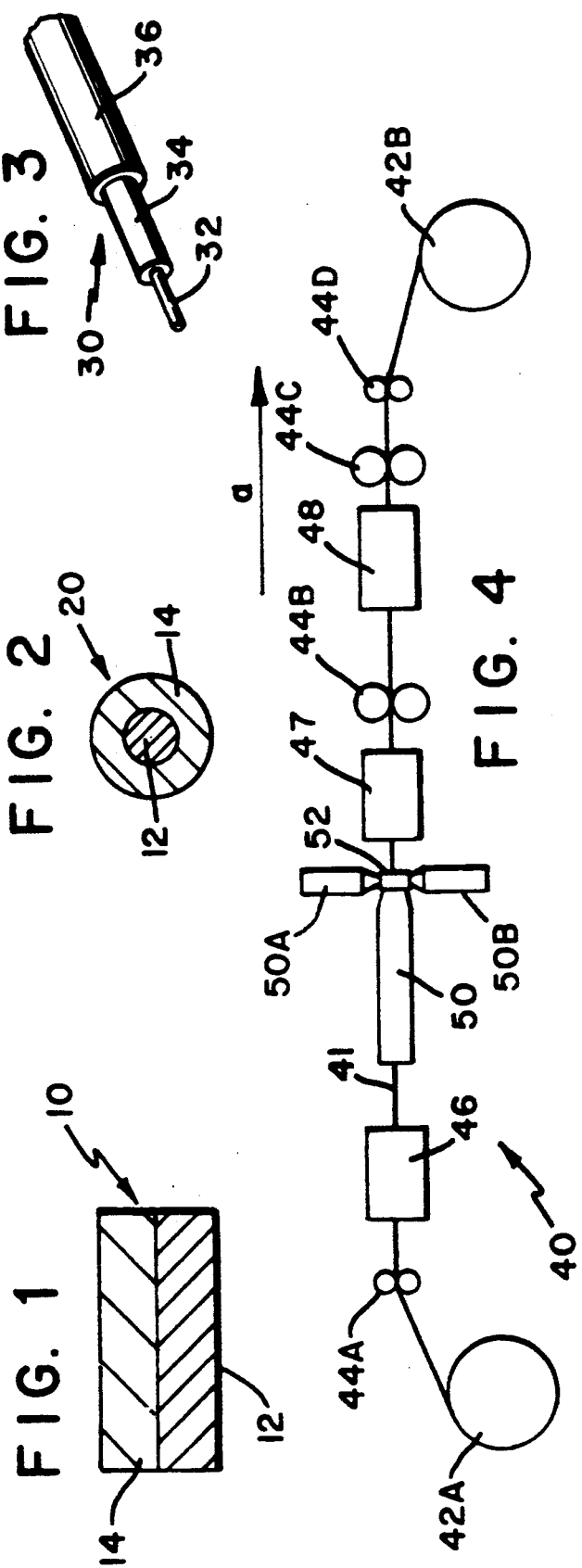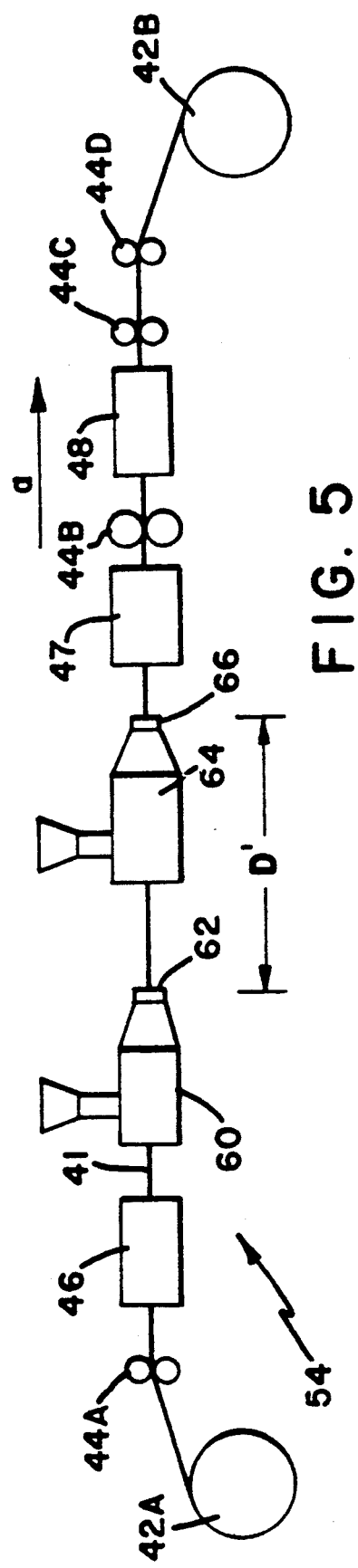

POLY(VINYL CHLORIDE) COMPOSITIONS EXHIBITING INCREASED ADHESIVITY TO POLYAMIDE AND MULTI-LAYER STRUCTURES COMPRISING THE SAME

BACKGROUND OF THE INVENTION

1. Field of the Invention

The present invention relates to improvements in poly(vinyl chloride) compositions which exhibit improved adhesivity to polyamide which find particular utility in the construction of multi-layer structures, particularly for the fabrication of improved structures for use in forming electrical insulation structures for wires and cables.

2. Description of the Prior Art

Multi-layer structures typically comprise at least two or more layers of materials featuring different physical properties, which properties are optimally optimized in order to satisfy a particular need at hand. The goal of the formation of such structures is to provide a structure which is directed to a particular need, and wherein the individual layers of the structures act to form a composite, and where each layer of material contributes to serve the function for which the structure is designed. Examples of such structures are well known to the art, and include composites which are used to form films, wherein each layer forming the film may feature a particular property, such as impermeability to a gas, or as a blocking layer to light or radio energy of a particular wavelength. Another example of such a structure may be those which would be used to form an insulation structure for an electrical conductor, where each layer forming a jacket about the conductor might feature improved abrasion resistance, or improved dielectric strength, or the like. Other uses of such structures are notorious and known to the art.

The use of such multi-layer structures is widespread with electrical conductors. These conductors typically consist of a wire conductor (which is frequently a metal, including copper) which is surrounded by a multi-layer structure. Examples such constructions include those taught in U.S. Pat. Nos. 3,576,940; 3,860,686; 4,079,191; 4,292,463; 4,327,248; 4,419,538; 4,472,597; 4,510,348; 4,626,619; and 4,691,082. Therein are disclosed a variety constructions wherein each of the layers may be a polymer, a metal, an elastomeric material, a fibrous material, etc., where each layer offers a particular advantage, i.e., dielectric strength, water impermeability, etc.

Two favorable materials which may be used in the construction of electrical conductors are poly(vinyl chloride) (hereinafter interchangeably referred to as "PVC") and polyamides (hereinafter interchangeably referred to as "PA"). These materials are favored as the PVC generally forms a good flexible insulator, while simultaneously, PA generally exhibit good abrasion resistance properties. Examples of electrical conductors having a multi-layer structure of an inner layer of poly(vinyl chloride) and an outer layer of polyamide are taught in Japanese Patent 59146105, British Patent 1257810, and Dutch Patent 6917475.

While such multi-layer structures comprising a layer of PVC and PA when used as electrical conductors are seen to perform well, such a structure retains drawbacks. One known problem is known to exist if the electrical conductor is stored outside and exposed to rain and high humidity. Upon contact with water, the polyamide layer tends to absorb moisture and expand considerably. This expansion causes the polyamide layer to swell away from the PVC layer and wrinkle. When the electrical conductor is then fed through a conduit, i.e. typically during installation, the wrinkled polyamide layer tears and the electrical conductor becomes unacceptable for use for its intended purpose. Further, a condition known to the art as "horse collaring" is known to occur, wherein sharp flexure of the wire causes separation of the polyamide and the poly(vinyl chloride) layers and the formation of bulges in the exterior layer in a direction transverse to that of the wife's length. The wire or cable exhibits an increased tendency to tear at such bulges, especially as the wire is subjected to mechanical stress as might be occasioned as the wire is pulled through a conduit, during installation of said wire or afterwards, due to vibration, thermal effects, etc.

It would be desirable to have a multi-layer structure where good adhesion exists between the PVC layer and the polyamide layer. Multi-layer structures having a PVC layer, an adhesive layer, and a polyamide layer are known. Japanese Patent 62041039 teaches an adhesive layer comprising an acid-modified olefinic polymer and an acid-modified halogen-containing olefinic polymer. German Patent 1669973 teaches an adhesive layer having: (1) a primer layer comprising a mixture of epoxide compounds, hardener, and solvent, and (2) an epoxy adhesive layer. Further, U.S. Pat. No. 4,868,054 illustrates a particularly successful embodiment of such a multi-layer structure, wherein the structure comprises (1) a layer of PVC, (3) a PA, and (2) an intermediate layer comprising an adhesive resin, plasticizer and a leveling agent.

While these multi-layer structures known to art may be beneficially used, there remains a continuing need in the art for multi-layer structures which would be particularly useful as insulation structures for electrical conductors wherein improved adhesion between the layers exists, particularly where the structure would be exposed to detrimental climatic conditions.

SUMMARY

The present invention provides a multi-layer structure having improved adhesion between its layers. The multi-layer structure has in the following order: a layer of a plasticized PVC; a layer of polyamide. The layer of PVC includes up to about 10 percent by weight of a vinyl resin, where said resin is a copolymer or a terpolymer which exhibits good solubility with the PVC, and which further provides good adhesivity with the PA. The vinyl resin is a vinyl chloride-vinyl acetate-vinyl alcohol terpolymer.

The present invention also provides an electrical conductor comprising in the following order structures which are layered in register: a wire conductor, a layer of PVC which comprises a vinyl resin providing improved adhesivity, and a layer of polyamide.

It has been found that the foregoing resin when included in the PVC provides superior adhesion between the PVC and PA layers. When subjected to testing to determine the interlayer adhesion between the PVC and the PA layers, structures which included the resin in the PVC were found to have markedly improved resistance to separation as compared to PVC and PA structures without any intermediate adhesive, or without any adhesive. Further, it has been noted that when the present electrical conductor was soaked in water so that the polyamide layer absorbed water, the bond between the PVC and polyamide layers remained.

The present invention also provides an improved extrusion method of producing an improved structure comprising a wire conductor, a layer of PVC which includes a vinyl resin providing improved adhesivity, and a layer of polyamide.

Other advantages of the present invention will become apparent from the following description, attached drawings, and appended claims.

BRIEF DESCRIPTION OF THE DRAWINGS

FIG. 1 is an end perspective view of one aspect of the invention, showing a multi-layer structure wherein the PVC and PA layers are of a generally planar form.

FIG. 2 is an end perspective view of a further aspect of the instant invention and shows a perspective view of a multi-layer structure in accordance with the present invention.

FIG. 3 is a further embodiment of the present invention, and illustrates an exploded perspective view of an electrical conductor utilizing the multi-layer structure of the present invention.

FIG. 4 is a schematic representation of an industrial process for producing a multi-layer structure of the invention by coextrusion techniques.

FIG. 5 is a further schematic representation of an industrial process for producing a multi-layer structure of the invention by tandem extrusion techniques.

DESCRIPTION OF THE PREFERRED EMBODIMENTS

According to the invention, a multi-layer structure having improved adhesion between its layers is provided, wherein a first layer comprises poly(vinyl chloride) and a vinyl chloride comprising copolymer or terpolymer, and a second layer comprising a polyamide. The structure exhibits improved adhesion between the first and second layers without the use of any intermediate material disposed between the layers having adhesive properties.

As has been noted above, the first layer comprises PVC and a copolymer or terpolymer. The PVC to be incorporated may be any grade of PVC desired, and as such allows for considerable flexibility in the specification of the PVC. The PVC may exhibit any desired physical properties, such as a desired molecular weight, flame retardant properties, or temperature duty rating, and may further include quantities of additives commonly used in the art, in amounts which are not found to be detrimental to the efficacy of the adhesion between the PVC and the PA layer.

One such additive are pigments or other coloring agents which may be blended or otherwise incorporated into the PVC layer; such colorants are useful in wire "coding" or other identification and/or marking systems.

A further useful additive which may be incorporated in the PVC is a plasticizer. The plasticizer acts to reduce the viscosity of the PVC during the production process, and thereby improve its processability. The amount of plasticizer which may be used is any amount which provides desirable processability for the formation of the structure of the present invention. By way of non-limiting example, in the production of insulated electrical wires, loading of between approximately 10% to 50% by weight of plasticizer into the PVC are used, although higher and lower amounts may be used. Examples of useful plasticizers include phthalate plasticizers, and preferably are one or more from the group consisting of di-2-ethylhexyl phthalate (DOP), diisodecyl phthalate (DIDP), diundecyl phthalate (DUP), and ditridecyl phthalate (DTDP). Equally preferred are trimellitate plasticizers, especially trioctyltrimellitate (TOTM) and triisooctyltrimellitate (TIOTM). These preferred trimellitate and phthalate plasticizers are commercially available.

Other additives may be also included in the composition. Constituents such as lead stabilizers, tin stabilizers, inorganic fillers such as clays, calcium carbonates, talc, waxes, wollastanite, or silica as well as various types of lubricants which are known and in common use in the art may also be introduced as additives into the composition according to the invention. Further additives include those which are broadly referred to as "synergists" useful for their fire retardant properties. One non-limiting example of such a synergist is antimony oxide, but other compositions including zinc borate and iron oxide, as well as other compositions which behave as synergists may also be incorporated into compositions in according with the inventors' teachings.

The vinyl chloride comprising copolymer or terpolymer of the present invention may be any hydroxyl-modified vinyl chloride/vinyl acetate/vinyl alcohol terpolymers, having a hydroxyl content in excess of 2 percent. Examples of such terpolymers which have been found to be useful include those materials sold under the trademark UCAR ® resins by Union Carbide Corp of Danbury, Conn. and designated as "VAGH" and "VAGD" and are described as hydroxyl modified resins consisting of vinyl chloride containing terpolymers and having a hydroxyl content of approximately 2.3 percent. Of these materials, those copolymers selected from the group consisting of partially hydrolyzed vinyl chloride/vinyl acetate/vinyl alcohol terpolymers designated "VAGD", and "VAGH" have been found to be particularly useful. The VAGD and VAGH terpolymers are both described as comprising of 90% by weight vinyl chloride units, 4% by weight vinyl acetate units and 6% by weight vinyl alcohol units, and having a hydroxyl functionality of about 2.3% by weight, and a hydroxyl value of 76. These materials are further described as having a specific gravity of 1.39 according to ASTM D792. More particularly, the VAGH resin is described as having a glass transition temperature of 79 deg. C., and a number average molecular weight of 27,000. Similarly, the VAGD resin is described as having a specific gravity of 1.39 according to ASTM D792, a glass transition temperature of 77 deg. C., and a number average molecular weight of 22,000. These terpolymers may be included in the PVC composition in any amount which results in effective bonding between the PVC comprising layer, and PA layer; amounts of as little as 1% by weight relative to the weight of PVC have been found to provide adhesivity between the PVC and PA layers. Preferably, the quantity of the terpolymer should exceed this amount, and quantities in excess of about 2% are to be preferred, with the most preferred amount to be between about 2% and about 10%. While still larger amounts of the terpolymer may be substituted, the economy of such a substitution would be offset by the marginal increase in adhesivity achieved.

In accordance with the present invention, it has been surprisingly observed that such vinyl chloride-vinyl acetate-vinyl alcohol terpolymers may be utilized to provide enhanced adhesion between layers of PVC and PA, especially nylons. It has been found that these terpolymers exhibit good solubility in plasticized PVC, and the presence of hydroxyl groups on the terpolymer enhances the adhesion of the co- and/or terpolymer containing PVC to the PA layer. It has been noted that the presence of up to about 5% hydroxyl concentration, and preferably between about 2% and 3% hydroxyl concentration enhances the adhesivity between the PVC and PA layers.

Polyamides suitable for use in conjunction with the instant invention include well-known polyamides which are long chained polymeric structures having recurring amide groups as part of their polymer backbone. Preferably, the polyamides have a relative viscosity of from about 40 to about 250 measured in 90% formic acid at a concentration of 9.2 weight percent.

Non-limiting examples of such polyamides are:

(a) those prepared by the polymerization of lactams, and preferably epsilon-caprolactam (nylon 6);

(b) those prepared by the condensation of a diamine with a dibasic acid, and preferably the condensation of hexamethylene diamine with adipic acid (nylon 6,6); the condensation of hexamethylene diamine with sebacic acid (nylon 6,10), the condensation of tetramethylenediamine with adipic acid (nylon 4,6), and the condensation of hexamethylene diamine with azelaic acid (nylon 6,9);

(c) those prepared by self-condensation of amino acids, and preferably self-condensation of 11-aminoundecanoic acid (nylon 11) and self-condensation of 12-aminododecanoic acid (nylon 12); and (d) those based on polymerized vegetable oil acids, or random, block, or graft interpolymers consisting of two or more of these polyamides, or polyamide blends.

Preferred polyamides are polyepsiloncaprolactam (nylon 6), polyhexamethylene adipamide (nylon 6,6), and a copolymer of polyepsiloncaprolactam and polyhexamethylene adipamide (nylon 6,6/6). The most preferred polyamide is polyepsiloncaprolactam.

Amorphous polyamides such as those prepared with a diacid and meta-or para-xylene diamine, 4,4'-methylenedianiline, 1,3- or 1,4-phenylenediamine, or 2,4- or 2,6- diaminotoluene are also useful.

The aforementioned polyamides containing various terminal functionalities are also suitable for use in the present invention. These include the preferred polyamides which comprise polycaprolactams (nylon 6) which include (a) a carboxylic group attached to one end and an acetamide group attached to the other end of the polymer chain, (b) an amino group attached to both ends of the polymer chain, (c) a carboxyl group attached to one end and an amino group attached to the other end of the polymer chain, and (d) a carboxyl group attached to both ends of the polymer chain. Of these, most preferred are those categorized as (c) above, and include a polycaprolactam having a carboxyl group attached to one end and an amino group attached to the other end of the polymer chain.

The polyamide layer may also include various amounts of additives which are of common usage in the art. Examples of such additives include pigments, dyes, heat stabilizers, lubricants such as sodium stearate, zinc stearate, plasticizers including caprolactam, UV absorbers and stabilizers.

In accordance with the teachings of the present invention, it is recognized that any amount of the terpolymer may be incorporated into the PVC with the sole proviso that an improvement in the adhesion between the PVC containing layer and a PA containing layer is ultimately realized. Preferably, the weight percentage of the terpolymer in the PVC composition is within the range of between 0.001% and 20%, more preferably falls within the range of between 0.01% and 12%, and most preferably is found between the range of 0.01% and 5%.

The PVC and the terpolymer constituents may be combined in any manner capable of thoroughly distributing the materials within one another. Methods which are recognized as suitable for use include physical mixing such as the physical mixing attained via the use of a tumbling vessel, and by melt extrusion. Preferably, the constituents are melt extruded wherein measured amounts of the PA and terpolymer constituents are physically mixed and subsequently introduced to a single screw extruder, twin-screw extruder, or plastificator, heated to a temperature above the softening point of at least one of the constituents and subsequently extruding the constituents through a die to form strands which are then pelletized. The resulting pellets comprising the PVC and the terpolymer are then used as the feedstock for the further extrusion operations in accordance with the present invention.

Both layers, i.e. the PVC and the PA layer may be in the form of a film or sheet obtained by separate extrusion processes, or alternately may be co-extruded. Similarly, if the PVC and the PA layer are of a different form, the form may be either separately, sequentially or co-extruded. Al though dependent upon the particular intended application, typically the PVC layer has a thickness of about 0.25 to about 2.30 mm, (about 0.010 to about 0.090 inches), and typically, the polyamide layer may have a thickness of about 0.05 to about 0.40 mm (about 0.002 to about 0.016 inches). It is to be understood that these thicknesses are for the purpose of illustration, and are not to be considered limiting the applicability of the teachings of the present invention.

The multi-layer structure according to the instant invention can be used in any application where a multi-layer structure is required. In general, the multi-layer structure is useful as an insulation and protective jacket. More specifically, the multi-layer structure in tubular form finds particular use in protecting a wire conductor, and in some applications in residential and/or commercial structures, and in protecting optical fibers. Such a structure is shown in FIG. 1 which is an end perspective view showing a multi-layer structure wherein the PVC and PA layers are of a generally planar form. As is shown, the structure 10 comprises two layers, a first layer 12 of PVC and a second layer 14 of PA. As is illustrated, the layers 12,14 are layered in register with one another. It is further seen that there is no intermediate structure disposed between the layers 12,14 which might be indicative of an adhesive material or the like.

FIG. 2 is an end perspective view of a further structure 20 according to the instant invention and shows a perspective view of a multi-layer structure in accordance with the present invention. The structure 20 comprises a first core-type layer 22 which, in contrast to the structure 10 according to FIG. 1 is seen to be generally non-planar but cylindrical in form. The structure 20 further includes a second layer 24 which comprises a PA layer, and is layered in register with the first layer 22. Similarly, these layers 22,24 are seen to be layered in register with one another, and FIG. 2 further shows the absence of any intermediate structure which might be indicative of an adhesive material or the like.

FIG. 3 portrays a further embodiment of the present invention, and illustrates an exploded perspective view of an electrical conductor 30 utilizing the multi-layer structure of the present invention. The electrical conductor 30 comprises a wire conductor 32 which may be formed from any suitable metal including copper, aluminum, copper-coated tin, silver-plated copper, and stainless steel. The wire conductor 32 may be of any suitable size, including but not limited to those between 1,000,000 CM (" circular mil") to about 22 AWG ("American Wire Gauge"), although it is contemplated that other wire conductors not within this particular preferred range may also enjoy the benefits of the present invention. Further, the wire conductor 32 may be a single solid metal conductor or a plurality of metallic conductors.

The first layer 34 (or "inner layer ") contacting the electrical conductor 20 is a layer of PVC which includes the co- or terpolymer and other additives in accordance with the teaching of the instant invention. This first layer 34 is in intimate contact with the wire conductor 32 and may be formed about the electrical conductor 20 by any suitable means. An extrusion process would be preferred. The thickness of the first layer 34 may be any desirable thickness and is not consequential to the practice of the present invention. However, thicknesses which are in common use are preferably employed. The second layer 36 (or "outer layer") intimately contacting the first layer 34 is a layer of a PA, and it may be formed about the first layer 32 by any suitable means, with an extrusion process being preferred. Similarly, the thickness of the second layer 36 is not consequent to the enjoyment of the invention, although thickness which are in common us e may be employed.

Turning now to FIG. 4, therein is illustrated a schematic representation of an industrial process for producing a multi-layer structure of the invention by coextrusion techniques.

A wire coating line 40 includes an extruder 50 having two barrels 50A and 50B equipped with a co-extruding die 52 capable of extruding the PVC containing the terpolymer and other constituents and PA comprising composition to form a structure onto the wire 41 in accordance with the present invention. Optionally, the wire coating line 40 includes a wire payout reel 42A for supplying wire 41, a wire takeup reel 42B for collecting wire 41 after it has been coated, a series of capstans/pinch rollers 44A, 44B, 44C, 44D which act to guide and/or transport the wire 41, and further equipment, including a wire pretreater 46 located before the extruder 50, a wire posttreater 47, and a marking station 48.

The production process necessary to enjoy the benefits of the present invention are processes which are generally utilized to form multi-layered insulated wires and cables. As such, the features of the processes discussed in conjunction with FIGS. 4 and 5 are to be considered illustrative, and not limiting. Generally, bare wire 41 is played from the wire payout reel 42A where it passes through rollers 44A and to a wire pretreater 46. The wire pretreater 46 is an optional process device within which the bare wire 41 may be conditioned prior to its coating in the extruder 50. Such conditioning may include preheating, chemical/physical cleaning operations, and/or other operations. Subsequently, the wire 41 enters into the crosshead supplied by the two extruders 50 which includes a die 52 capable of extruding the two layers, i.e. the PVC layer and the PA layer onto the wire in accordance with the discussion of the constructions and compositions disclosed above. It is contemplated that the two extruders 50 and the coextrusion die 52 may be any of those presently known to the art, or those yet to be developed which find utility in extruding a plurality of layers of material onto a wire or other structure. One example which is presently known to the art comprises two extruders each having at least one hopper for the containment and feeding of the PVC comprising composition and the PA comprising composition which feed their respective constituents to the heated barrel of each of the extruders, which softens the respective compositions and which leads to a suitably formed die 52 which sequentially extrudes the material onto the wire or other structure. Such extruders typically include a rotating screw within each heated barrel (shown on FIG. 4 as 50A and 50B) to effectively mix each of its constituents and to force it into the die 52. The one-stage extrusion process provides benefits which include rapid throughput and overall production rates.

Subsequent to the coextrusion, the exiting wire 41 may optionally be subjected to a wire posttreater 47 which is a conditioner or conditioning step subsequent to the application of the insulation structure onto the wire 41. The posttreater 47 may be any conditioning step or operation, and might comprise a cooling operation, a further heating process to drive off any organic materials and/or effect curing of one or both of the layers extruded onto the wire 41, a quenching operation such as a water bath, or other beneficial conditioning process. Subsequently, the wire 41 passes through further capstans/pinch rollers 44B and may be passed to an imprinting station 48 wherein the exterior of the insulated wire 41 is marked with identifying information in a manner well known to the art. Subsequently, the wire 41 passes through further capstans/rollers 44C, 44D and is taken up by the wire takeup reel 42B. Thence, the insulated wire 41 may be removed from the wire coating line 40 and utilized.

FIG. 5 is a further schematic representation of a process for producing a multi-layer structure of the invention by a "tandem" extrusion process. This wire extrusion line 54 substantively differs from that portrayed in FIG. 4 only by the substitution of the single crosshead die 52 as shown on FIG. 4 with two extruders 60, 64 each with its own die, 62, 66; consequently, similarly designated elements within FIG. 4 and FIG. 5 are considered interchangeable and commentary concerning their operation as discussed for FIG. 4 is deemed equivalent and incorporated herein by reference. In this embodiment of the invention as shown on FIG. 5, the wire 41 entering a suitable die 62 which is fed by the extruder 60 and is coated with a first layer of the PVC composition as discussed above. The wire 41 coated with the PVC comprising composition then travels over a distance "D"' before where it is coated within a second die 66 which is fed by extruder 64 with the polyamide layer to form a structure in accordance with the teachings of the present invention. The distance "D"' may be any distance less than a distance where it is observed that the bonding between the PVC and the PA layers is unsatisfactory.

In the foregoing discussion of FIG. 4 and FIG. 5, the use of multi-layer structures of the present invention have been discussed and described in conjunction with the formation of an insulation structure for a wire conductor or wire cable. However, the utility of the invention in other applications which might find benefit is not to be discounted; usage with other strand type materials, including fibers, optical fibers and the like are expressly contemplated. Further, the relative terms "inner" and "outer" have been used in describing the relative position of the PVC comprising and the PA comprising layers; such a convention has been adopted as a matter of convenience and not as a matter of necessity. Constructions where the PA layer forms the "inner" layer and the PVC comprising layer forms the "outer" layer are contemplated.

EXAMPLES

Examples 1-3

A plurality of wire samples were produced having the compositions of their PVC comprising layer according with the materials outlined on Table 1. These examples were produced by coextrusion techniques.

TABLE 1

| Terpolymer: | Ratio of plasticized PVC/Terpolymer (%): | Observed Adhesion: |
| --- | --- | --- |
| none | 100/0 | poor |
| VAGD | 90/10 | excellent |
| VAGH | 90/10 | excellent |

The percentages of all other constraints were held constant. Examples 1-3 utilized a 14 gauge solid copper wire, onto which was first extruded a 16 mil thick layer of the PVC composition (which comprised the vinyl chloride-vinyl acetate-vinyl alcohol terpolymers) and subsequently a 5 mil thick layer of a PA was extruded onto the extruded PVC comprising layer. The PA used was "Capron ® 8224 HS" which is a Nylon-6 polyamide resin characterized as a medium viscosity, heat stabilized material having a specific gravity of 1.13, a melting point of 420 deg. F. (215 deg. C.). The PVC used was "Noraplas 19940" which is a PVC described as a plasticized PVC which contains virgin PVC resin, as well as other additives including plasticizers and other commonly used additives. Noraplas 19440 may be commercially obtained from North American Plastics Co. As with all the additives which may be used in conjunction with the teachings of the present invention, the quantities of additives may be in any amount effective to fulfill the function for which they are included in a composition and which does not have any markedly deleterious effect upon the benefits of the invention as taught herein. As described above, the terpolymers were the UCAR®]"VAGH" and "VAGD" resins available from Union Carbide Corp. of Danbury, Conn. All of the constituents were weighed out in their respective amounts before the extrusion operation.

Table 1 characterizes the adhesive strength between the two layers in a manner which indicates the interfacial adhesion observed. A rating of "poor" would indicate that the two layers showed little or no interfacial adhesion when the two layers were manually pulled apart. A rating of "good" would indicate that the two layers showed good interfacial adhesion and that the two layers could be pulled apart only with modest difficulty. A rating of "excellent" would indicate that the two layers could not be pulled apart, or could be pulled apart only with extreme difficulty, and would indicate that the two layers exhibited superior interfacial adhesion.

As has been noted, the samples utilizing the UCAR% terpolymer resins labelled "VAGD" and "VAG" showed exhibited excellent bonding between the two layers as indicated in Table 1, with no observed separation even subsequent to efforts to mechanically separate the two layers by tearing and/or pulling the layers apart.

Example 4

A composition comprising 90 parts by weight Noraplas 19940 plasticized PVC was combined with parts by weight UCAR ® VAGH terpolymer resin by melt extrusion in a Killion one-and-one-quarter inch single screw, non-intensive extruder. The extrudate was then pelletized.

Subsequently the pelletized composition produced was then provided to a first extruder having a Barrier Maddox screw which was operated under the following conditions: temperature profile: zone 1, set temperature, 350 deg. F., actual temperature, 357 deg. F.; zone 2, set temperature, 360 deg. F., actual temperature, 372 deg. F.; zone 3, set temperature, 370 deg. F., actual temperature, 373 deg. F.; zone 4, set temperature 380 deg. F., actual temperature, 381 deg. F.; clamp, set temperature 380 deg. F., actual temperature, 346 deg. F.; adapter, set temperature 380 deg. F., actual temperature 373 deg. F.; die head, set temperature 380 deg. F., actual temperature 382 deg. F. The screw was operated to rotate at 36 RPM, the motor drew 115 amperes current, and the pressure was maintained at 2000 psi. The throughput rate of the wire was 215 feet per minute (fpm). Into a second extruder equipped with a single flighted metering screw, pelletized Capron ® 8224 HS was provided. The second extruder was maintained at the following operating conditions: temperature profile: zone 1, set temperature, 490 deg. F., actual temperature, 492 deg. F.; zone 2, set temperature, 500 deg. F., actual temperature, 493 deg. F.; zone 3, set temperature, 510 deg. F., actual temperature, 508 deg. F.; zone 4, set temperature 520 deg. F., actual temperature, 513 deg. F.; clamp, set temperature 520 deg. F., actual temperature, 521 deg. F.; adapter, set temperature 520 deg. F., actual temperature 505 deg. F.; die head, set temperature 500 deg. F., actual temperature 531 deg. F. The screw was operated to rotate at 46 RPM, the motor drew 45 amperes of current, and the pressure was maintained at 1100 psi. The substrate temperature was noted to be 200 deg. F. The plasticized PVC comprising composition was first extruded onto a bare AWG 0000 gauge THNN conductor after which the Capron ® 8224 HS was extruded thereonto. Excellent interfacial adhesion was observed. Testing of the sample for "horsecollaring" in order to determine the separation of the two resin layers was done by bending the sample to its minimum obtainable radius which was approximately a one inch radius. No separation or wrinkling of the resin layers was observed on the conductor.

Example 5

A composition comprising 95 parts by weight Noraplas 19940 PVC composition was combined with 5 parts by weight of UCAR ® VAGH terpolymer resin by melt extrusion in a Killion one-and-one-quarter inch single screw, non-intensive extruder. The extrudate was pelletized.

Subsequently, the pelletized composition made was then provided to a first extruder having a Barrier Maddox screw which was operated under the conditions outlined in conjunction with Example 4 above, and extruded onto an AWG 0000 gauge THNN copper conductor and tested, as noted above. The interfacial adhesion observed was found to be excellent, and there was no evidence of wrinkling of the materials subsequent to "horsecollar" testing.

Example 6

A composition comprising 95 parts by weight of Noraplas 19940 plasticized PVC was combined with 5 parts by weight UCAR® VAGH terpolymer resin by melt extrusion in a Killion one-and-one-quarter inch single screw, non intensive extruder. The extrudate was pelletized.

Subsequently the pelletized composition was provided to a first extruder having a Barrier Maddox screw which was operated under the following conditions: temperature profile: zone 1, set temperature, 350 deg. F., actual temperature, 357 deg. F.; zone 2, set temperature, 350 deg. F., actual temperature, 368 deg. F.; zone 3, set temperature, 350 deg. F., actual temperature, 348 deg. F.; zone 4, set temperature 350 deg. F., actual temperature, 355 deg. F.; clamp, set temperature 345 deg. F., actual temperature, 334 deg. F.; adapter, set temperature 345 deg. F., actual temperature 343 deg. F.; die head, set temperature 345 deg. F., actual temperature 344 deg. F. The screw was operated to rotate at 34 RPM, the motor drew 170 amperes of current and the pressure was maintained at 2800 psi. The throughput rate of the wire was 160 fpm. Into a second extruder equipped with a single flighted metering screw, pelletized Capron® 8224 HS was provided. The second extruder was maintained at the following operating conditions: temperature profile: zone 1, set temperature, 490 deg. F., actual temperature, 486 deg. F.; zone 2, set temperature, 500 deg. F., actual temperature, 482 deg. F.; zone 3, set temperature, 500 deg. F., actual temperature, 486 deg. F.; zone 4, set temperature 500 deg. F., actual temperature, 483 deg. F.; zone 5, set temperature, 500 deg. F., actual temperature, 510 deg. F.; clamp, set temperature 500 deg. F., actual temperature, 497 deg. F.; adapter, set temperature 500 deg. F., actual temperature 499 deg. F.; die head, set temperature 500 deg. F., actual temperature 502 deg. F. The screw was operated to rotate at 36 RPM, the motor drew 41 amperes of current, and the pressure was maintained at 1800 psi. The substrate temperature was in the range of 170–180 deg. F. The wire sample showed good interfacial adhesion between the PVC containing layer and the nylon layers. Testing for "horsecollaring" in accordance with the protocol outlined in Example 4 above showed no separation or wrinkling of the resin layers.

Example 7

A composition comprising 98 parts by weight of Noraplas 19940 plasticized PVC was combined with 2 parts by weight UCAR® VAGH terpolymer and processed in accordance with the procedure outlined in Example 6 above, and the insulated electrical conductor tested. Only fair interfacial adhesion was observed and the two resin layers could be separated by pulling them apart with a moderate degree of effort. There was no wrinkling or separation of the two resin layers when the sample was subjected to the "horsecollaring" evaluation.

Example C1

A composition comprising 100 parts by weight Noraplas 19940 PVC and no terpolymer was processed and extruded onto a wire conductor in accordance with the method outlined in conjunction with Example 6 above. This composition was formulated to provide a comparison for evaluating PVC compositions without the additional terpolymers which form a part of the teaching of the instant invention. The two layers of the insulated conductors formed were easily separable by pulling, and the insulation structure wrinkled appreciably upon subjecting the wire sample to "horsecollaring" testing.

Example 8

A composition comprising 90 parts by weight Noraplas 19940 plasticized PVC was combined with 10 parts by weight UCAR® VAGH terpolymer resin by melt extrusion in a Killion one-and-one-quarter inch single screw, non-intensive extruder. The extrudate was pelletized.

Subsequently the peletized composition made was then provided to a first extruder having a Barrier Maddox screw which was operated under the following conditions: temperature profile: zone 1, set temperature, 350 deg. F., actual temperature, 355 deg. F.; zone 2, set temperature, 360 deg. F., actual temperature, 364 deg. F.; zone 3, set temperature, 370 deg. F., actual temperature, 375 deg. F.; zone 4, set temperature 380 deg. F., actual temperature, 377 deg. F.; clamp, set temperature 380 deg. F., actual temperature, 376 deg. F.; adapter, set temperature 380 deg. F., actual temperature 365 deg. F.; die head, set temperature 380 deg. F., actual temperature 379 deg. F. The screw was operated to rotate at 31 RPM, the motor drew 120 amperes of current, and the pressure was maintained at 1700 psi. The throughput rate of the wire was 1880 fpm. Into a second extruder equipped with a single flighted metering screw, pelletized Capron® 8224 HS was provided. The second extruder was maintained at the following operating conditions: temperature profile: zone 1, set temperature, 490 deg. F., actual temperature, 474 deg. F.; zone 2, set temperature, 500 deg. F., actual temperature, 499 deg. F.; zone 3, set temperature, 510 deg. F., actual temperature, 505 deg. F.; zone 4, set temperature 520 deg. F., actual temperature, 518 deg. F.; clamp, set temperature 520 deg. F., actual temperature, 512 deg. F.; adapter, set temperature 520 deg. F., actual temperature 494 deg. F.; die head, set temperature 520 deg. F., actual temperature 518 deg. F. The screw was operated to rotate at 56 RPM, the motor drew 16 amperes of current, and the pressure was maintained at 1400 psi. The substrate temperature was in the range 130°140 deg. F. The two resins were tandem extruded onto a AWG 14 gauge copper conductor for evaluation purposes including interfacial adhesion of the two resin layers. The wire sample showed excellent interfacial adhesion between the PVC containing layer and the nylon layers.

Example 9

A composition comprising 95 parts by weight Noraplas 19940 and 5 parts by weight VAGH terpolymer were processed, and tandem extruded onto AWG 14 copper conductors in accordance with the process outlined in Example 8 above, and tested to determine the interfacial adhesion of the two resin layers. The interfacial adhesion was found to be very good, and the layers could be separated by pulling the layers apart and exerting strong effort.

Example 10

A composition comprising 98 parts by weight Noraplas 19940 and 2 parts by weight VAGH terpolymer were processed, and tandem extruded onto AWG 14 copper conductors in accordance with the process outlined in Examples 8 and 9 above, and tested to determine the interfacial adhesion of the two resin layers. The interfacial adhesion was found to be fair, and while the layers did exhibit some tackiness due to some adhesive characteristics, the layers could be separated by pulling the layers apart and exerting moderate effort.

Example C2

A composition for comparative purposes comprising 100 parts by weight Noraplas 19940 plasticized PVC resin and no terpolymer. The composition was processed in the manner outlined for Examples 9 and 10 and tandem extruded onto AWG 14 gauge copper conductors. The two layers of the insulated conductors formed were easily separable by pulling.

It will be appreciated that the instant specifications and examples set forth herein are by way of illustration and not limitation, and that various modifications and changes may be made without departing from the spirit and scope of the present invention, whose limitations are bounded only by the appendant claims.

We claim:

1. A multi-layer structure consisting essentially of:
   an electrical conductor or an optical fiber,
   a layer of a polyamide,
   a layer of a plasticized poly(vinyl chloride) which includes more than zero percent and up to 10 percent by weight of a vinyl chloride-vinyl acetate-vinyl alcohol terpolymer having a hydroxyl content between two percent and five percent by weight,
   wherein said plasticized poly(vinyl chloride) layer is interposed between said electrical conductor or optical fiber and said polyamide layer.

2. The multilayer structure according to claim 1 wherein the polyamide is one selected from the group consisting of
   (a) those prepared by the polymerization of lactams;
   (b) those prepared by the condensation of a diamine with a dibasic acid;
   (c) those prepared by self-condensation of amino acids;
   (d) those based on polymerized vegetable oil acids; and
   (e) random, block, or graft interpolymers consisting of two or more of polyamides, or polyamide blends.

3. The structure according to claim 2 wherein the polyamides are selected from the group consisting of polyepsiloncaprolactam, polyhexamethylene adipamide, and copolymers of polyepsiloncaprolactam and polyhexamethylene adipamide.

4. The structure according to claim 2 wherein the polyamides contain terminal functional groups selected from the group consisting of hydroxyl, carboxyl, carboxylic, amide, acetamide, and amine.

5. The structure according to claim 1 wherein the plasticizer of the layer of plasticized poly(vinyl chloride) is at least one plasticizer selected from the group consisting of di-2-ethylhexyl phthalate (DOP), diisodecyl phthalate (DIDP), diundecyl phthalate (DUP), ditridecyl phthalate (DTDP), trioctyltrimellitate (TOTM) and triisooctyltrimellitate (TIOTM).

6. The structure according to claim 1 which further comprises a fire retardant synergist.

7. The structure according to claim 6 wherein the fire retardant synergist is at least one selected from the group consisting of antimony oxide, zinc borate and iron oxide.

8. The structure according to claim 1 which further includes at least one additive selected from the group consisting of lead stabilizers, tin stabilizers, inorganic fillers, clay, calcium carbonate, talc, wollastanite, and silica.

9. The structure according to claim 1 where the vinyl chloride-vinyl acetate-vinyl alcohol terpolymer comprises more than zero percent and less than six percent by weight of the poly(vinyl chloride) layer of the structure.

10. The structure according to claim 1 where the vinyl chloride-vinyl acetate-vinyl alcohol terpolymer comprises at least one percent and less than six percent by weight of the poly(vinyl chloride) layer of the structure.

* * * * *